US012300452B2

(12) United States Patent
Gode et al.

(10) Patent No.: US 12,300,452 B2
(45) Date of Patent: May 13, 2025

(54) SOLENOID DRIVER FOR A CIRCUIT BREAKER

(71) Applicant: EATON INTELLIGENT POWER LIMITED, Dublin (IE)

(72) Inventors: Harish Gode, Pune (IN); David Walter Brooking, New Galilee, PA (US); Theodore James Miller, McDonald, PA (US); Sapana Darekar, Pune (IN)

(73) Assignee: EATON INTELLIGENT POWER LIMITED, Dublin (IE)

( * ) Notice: Subject to any disclaimer, the term of this patent is extended or adjusted under 35 U.S.C. 154(b) by 257 days.

(21) Appl. No.: 18/119,903

(22) Filed: Mar. 10, 2023

(65) Prior Publication Data

US 2024/0304403 A1 Sep. 12, 2024

(51) Int. Cl.
*H01H 47/00* (2006.01)
*H01H 47/32* (2006.01)

(52) U.S. Cl.
CPC ........ *H01H 47/325* (2013.01); *H01H 47/002* (2013.01); *H01H 2047/003* (2013.01)

(58) Field of Classification Search
CPC .... H01H 47/325; H01H 47/002; H01H 3/001; H01H 2047/003
See application file for complete search history.

(56) References Cited

U.S. PATENT DOCUMENTS

| | | | | | |
|---|---|---|---|---|---|
| 5,774,319 | A * | 6/1998 | Carter | H02H 1/06 361/100 |
| 5,861,746 | A * | 1/1999 | Ensten | B60T 8/36 324/207.16 |
| 10,640,059 | B2 * | 5/2020 | Yamashita | H01F 7/1844 |
| 12,176,144 | B2 * | 12/2024 | Arensmeier | F16K 31/0675 |
| 2019/0267173 | A1 * | 8/2019 | Shaffer | H01F 7/064 |
| 2020/0135373 | A1 * | 4/2020 | Muhammed | H01F 7/064 |

* cited by examiner

*Primary Examiner* — Sisay G Tiku
(74) *Attorney, Agent, or Firm* — Eckert Seamans Cherin & Mellott, LLC

(57) ABSTRACT

A solenoid driver circuit for a circuit breaker is provided. The circuit breaker includes a control circuit, a solenoid and secondary contacts and is structured to be coupled between a power source and a load. The solenoid driver circuit includes a first switch coupled to a solenoid and a first resistor structured to sense solenoid current; a second switch coupled to a second resistor, the second switch structured to be turned on based on a switch drive signal from the control circuit; one pulse width modulation (PWM) current controller coupled to the control circuit, the first switch, the second switch and the first resistor, the one PWM current controller structured to adjust the solenoid current and drive the solenoid to open or close the secondary contacts using a plurality of peak solenoid current limits including a first peak solenoid current limit and a second peak solenoid current limit.

20 Claims, 8 Drawing Sheets

SOLENOID DRIVER FOR A CIRCUIT BREAKER

FIELD OF THE INVENTION

The disclosed concept relates generally to an apparatus and method of driving a solenoid in a circuit breaker in an electrical network, and in particular a solenoid driver circuit structured to drive a solenoid in a circuit breaker based on a plurality of peak current limit of a solenoid coil.

BACKGROUND OF THE INVENTION

Circuit interrupters, such as for example and without limitation, circuit breakers, are typically used to protect electrical circuitry from damage due to an overcurrent condition, such as an overload condition, a short circuit, or another fault condition, such as an arc fault or a ground fault. Circuit breakers typically have a pair of primary separable contacts opened and closed by a spring biased operating mechanism. A thermal magnetic trip device actuates in response to persistent overcurrent conditions and short circuits. Some circuit breakers are remotely operable to allow an end user to perform, e.g., load shedding or load management. Such remote circuit breakers may include secondary contacts in series with the primary separable contacts. The primary contacts interrupt the overcurrent, while the secondary contacts perform secondary switching operations. The secondary contacts are controlled by a solenoid(s) including a plunger and a solenoid coil(s) (e.g., without limitation, one open/close solenoid coil or one open solenoid coil with one close solenoid coil). To close the secondary contacts, the solenoid coil is energized to push the plunger downwardly and close the secondary contacts. When a load shedding is desired, the open solenoid coil is energized to lift the plunger and open the secondary contacts. To close the secondary contacts, the close solenoid coil is pulsed. In some examples, the solenoid may have a magnet which latches in one position, and thus, not be energized to keep the secondary contacts closed. A PWM (pulse width modulation) current controller may be used to control the solenoid coil to open and close by supplying the solenoid current. Typically, the PWM current controller sets only one peak current limit for driving the solenoid coil to open the secondary contacts. Such one level setting PWM current controller is not useful when more than one level of peak current limit is needed. For example, opening the secondary contacts in normal condition for a 2-pole circuit breaker may require approximately 4 amps (A) solenoid current, but opening the secondary contacts in tack-welded contact condition may require a much higher solenoid current (e.g., approximately 8A). As such, if the PWM current controller can set one peak current limit sufficient to open the secondary contacts in normal condition only, that PWM current controller becomes useless if the secondary contacts are in tack-welded condition. Thus, in order to drive the solenoid to open the secondary contacts in normal condition as well as in tack-weld condition, two PWM current controllers must be installed within the circuit breaker. Such installation of the additional PWM current controller and associated circuit within the already crowded circuit breakers not only wastes the limited breaker space, but also increases manufacturing costs and labor.

There is room for improvement in remotely controlled circuit breakers.

There is a need for an improved solenoid driver circuit to open secondary contacts in circuit breaker.

SUMMARY OF THE INVENTION

These needs, and others, are met by embodiments of the disclosed concept in which a solenoid driver circuit for a circuit breaker is provided. The circuit breaker includes a control circuit, a solenoid and secondary contacts and structured to be coupled between a power source and a load. The solenoid driver circuit includes a first switch coupled to the solenoid and a first resistor structured to sense solenoid current; a second switch coupled to a second resistor, the second switch structured to be turned on based on a switch drive signal from the control circuit; one pulse width modulation (PWM) current controller coupled to the control circuit, the first switch, the second switch and the first resistor, the one PWM current controller structured to adjust the solenoid current and drive the solenoid to open or close the secondary contacts using a plurality of peak solenoid current limits including a first peak solenoid current limit and a second peak solenoid current limit.

Another embodiment provides a circuit breaker including: primary contacts and secondary contacts coupled to the primary contacts in series; an operating mechanism structured to open and close the primary contacts based on operation of a trip device; a control circuit structured to control and monitor operation of the circuit breaker; a solenoid; and a solenoid driver circuit. The solenoid driver circuit includes a first switch coupled to the solenoid and a first resistor structured to sense solenoid current; a second switch coupled to a second resistor, the second switch structured to be turned on based on a switch drive signal from the control circuit; and one pulse width modulation (PWM) current controller coupled to the control circuit, the first switch, the second switch and the first resistor, the one PWM current controller structured to adjust the solenoid current and drive the solenoid to open or close the secondary contacts using a plurality of peak solenoid current limits including a first peak solenoid current limit and a second peak solenoid current limit.

Yet another embodiment provides a method of opening or closing secondary contacts of a circuit breaker using a solenoid driver circuit disposed in the circuit breaker. The method includes: determining if a user command to open the secondary contacts has been received; in response to a determination that user command to open the secondary contacts has been received, opening the secondary contacts by a solenoid coupled to one pulse width modulation (PWM) current controller of the solenoid driver circuit using a first peak solenoid current limit, determining if the secondary contacts are open using the first peak solenoid current limit; and in response to a determination that the secondary contacts are not open, opening the secondary contacts by the solenoid using a second peak solenoid current limit.

BRIEF DESCRIPTION OF THE DRAWINGS

A full understanding of the invention can be gained from the following description of the preferred embodiments when read in conjunction with the accompanying drawings in which.

DETAILED DESCRIPTION OF THE INVENTION

Figure 1:
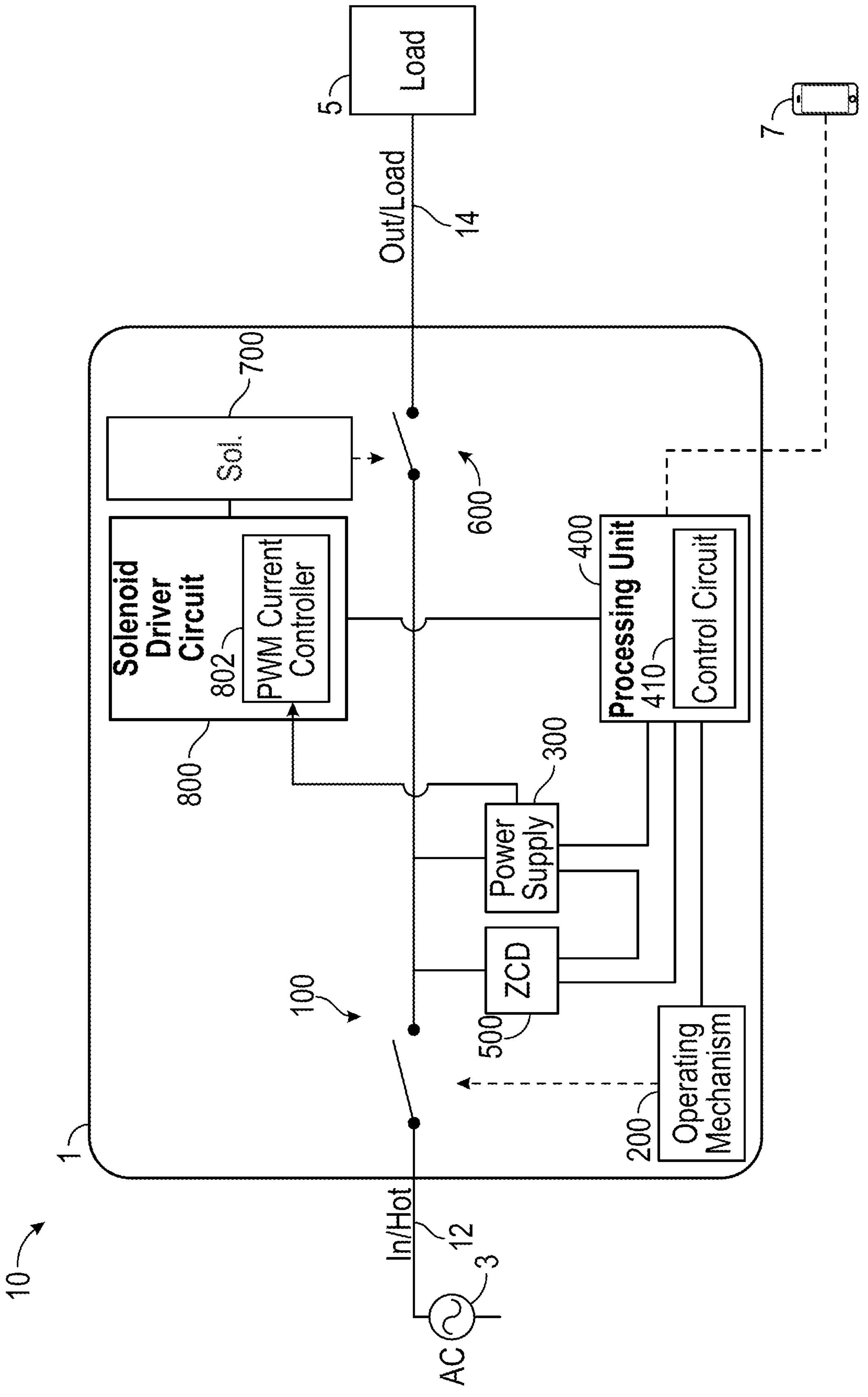
FIG. 1 is a block diagram of a power distribution system in accordance with an example embodiment of the disclosed concept.

Directional phrases used herein, such as, for example, left, right, front, back, top, bottom and derivatives thereof, relate to the orientation of the elements shown in the drawings and are not limiting upon the claims unless expressly recited therein.

As employed herein, the statement that two or more parts are "coupled" together shall mean that the parts are joined together either directly or joined through one or more intermediate parts.

Some example embodiments of the disclosed concept, which will be described in more detail herein, provide an apparatus, a system and method for driving a solenoid to open secondary contacts by using a solenoid driver circuit including only one PWM current controller structured to set a plurality of peak solenoid current limits and adjust solenoid current to achieve respective peak solenoid current limit.

In one exemplary embodiment, by simply adding a switch coupled to resistors structured to be in parallel to an existing sense resistor(s) of the one PWM current controller upon closing of the added switch, the solenoid driver circuit according to the disclosed concept allows that single PWM current controller to drive the solenoid with at least two different peak solenoid current limits. In another exemplary embodiment, by simply adding a single additional switch and a single additional resistor structured to be in parallel to a peak resistor of the one PWM current controller upon turning on the single additional switch, the solenoid driver circuit in this embodiment allows the single PWM current controller to drive the solenoid with at least two different peak solenoid current limits. As such, while driving the solenoid by regulating the solenoid current based on a first peak current limit set by an existing sense resistors, the added switch(es) and resistor(s) allow the PWM current controller to set a second peak current limit and regulate the solenoid current to achieve the second peak current limit to open the tack-welded secondary contacts, which require more plunger force to break the tack weld.

Further, the solenoid driver circuit saves costs and breaker space by requiring only one PWM current controller to set multiple different peak current limits, rather than requiring one PWM current controller per each peak current limit as the conventional solenoid driver circuits do. In addition, the solenoid driver circuit utilizes zero crossing detection with a predefined offset (e.g., without limitation, 2 ms) to manage the solenoid operation, thereby eliminating a need to install a large reservoir capacitor that is otherwise required for energy storage to drive the solenoid during negative half cycles in a half bridge configuration.

FIG. 1 is a diagram of a power distribution system 10 in accordance with an example embodiment of the disclosed concept. The power distribution system 10 includes a circuit interrupter (e.g., without limitation, a circuit breaker) 1, a power source 3, and a load 5. The circuit breaker 1 is structured to be electrically connected between the power source (e.g., without limitation, AC utility providing 110V AC line voltage at 60 Hz) via the HOT conductor 12 and a load 5 via the LOAD conductor 14. The circuit breaker 1 is structured to trip open or switch open to interrupt current flowing to the load 5 in case of a fault condition (e.g., without limitation, an overcurrent condition) to protect the load 5, circuitry associated with the load 5, as well as the components within the circuit breaker 1. The circuit breaker 1 may be a remote controllable smart breaker, and communicatively coupled to a mobile device 7 of an end user to turn on or off the load remotely.

The circuit breaker 1 includes primary contacts 100, operating mechanism 200, a power supply circuit 300, a processing unit 400, a zero crossing detector (ZCD) 500, secondary contacts 600, solenoid 700 and a solenoid driver circuit 800. The primary contacts 100 are connected in series with the secondary contacts 600 and include a primary stationary contact and a primary moving contact coupled to a primary moving arm. The operating mechanism 200 includes the primary moving arm as well as other components (e.g., without limitation, a lever, a cradle, a support for the cradle, a spring) and is structured to physically open and close the primary contacts 100 based on operation of a thermal-magnetic trip device (not shown). The circuit breaker 1 may also include an electric trip unit (not shown) structured to control the operating mechanism 200 based on a signal including voltage measured at an output of a current sensor (not shown).

Figure 2A:
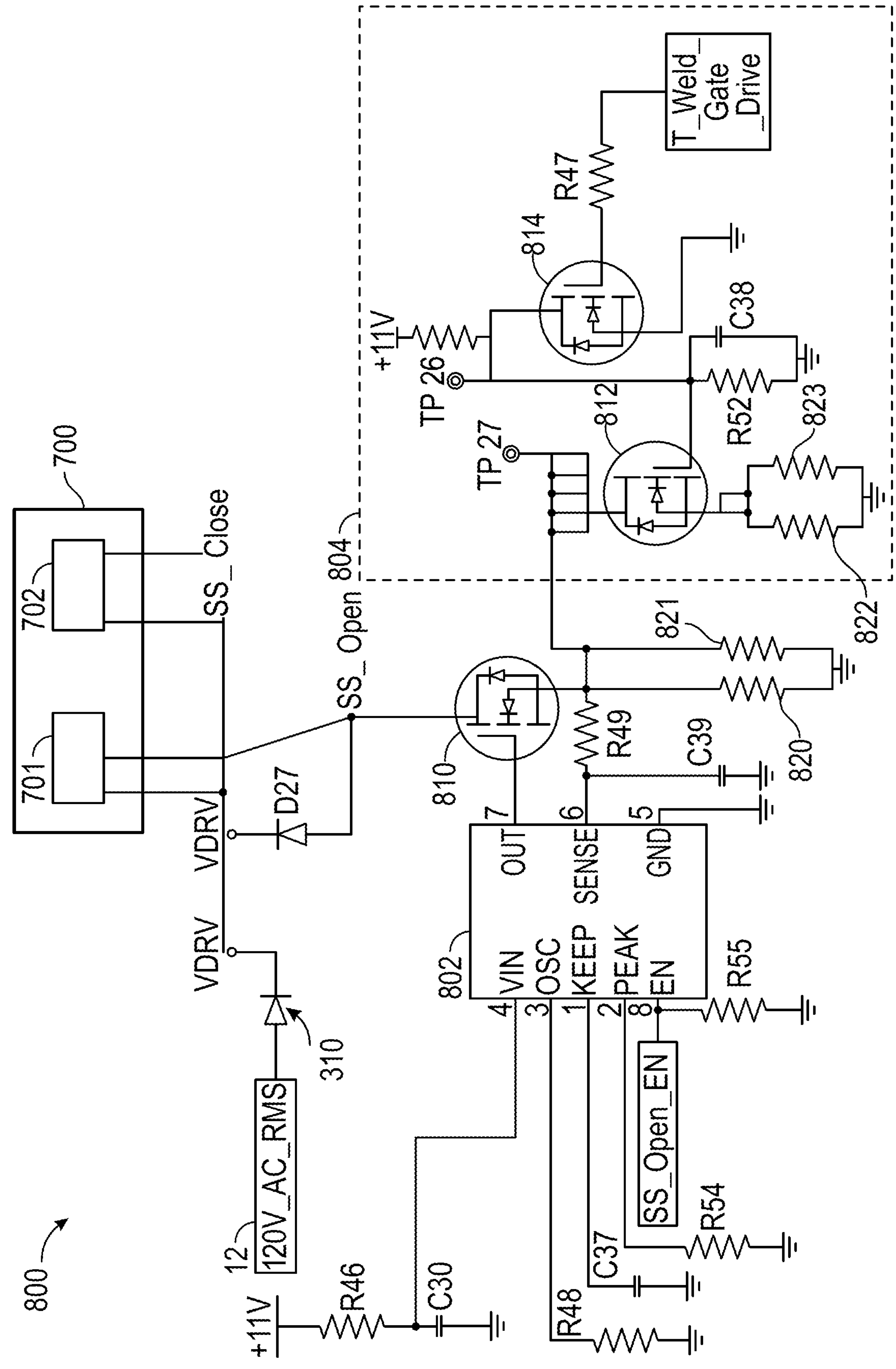
FIG. 2A is a schematic diagram of an exemplary solenoid driver circuit for opening secondary contacts in accordance with an example embodiment of the disclosed concept.
Figure 2B:
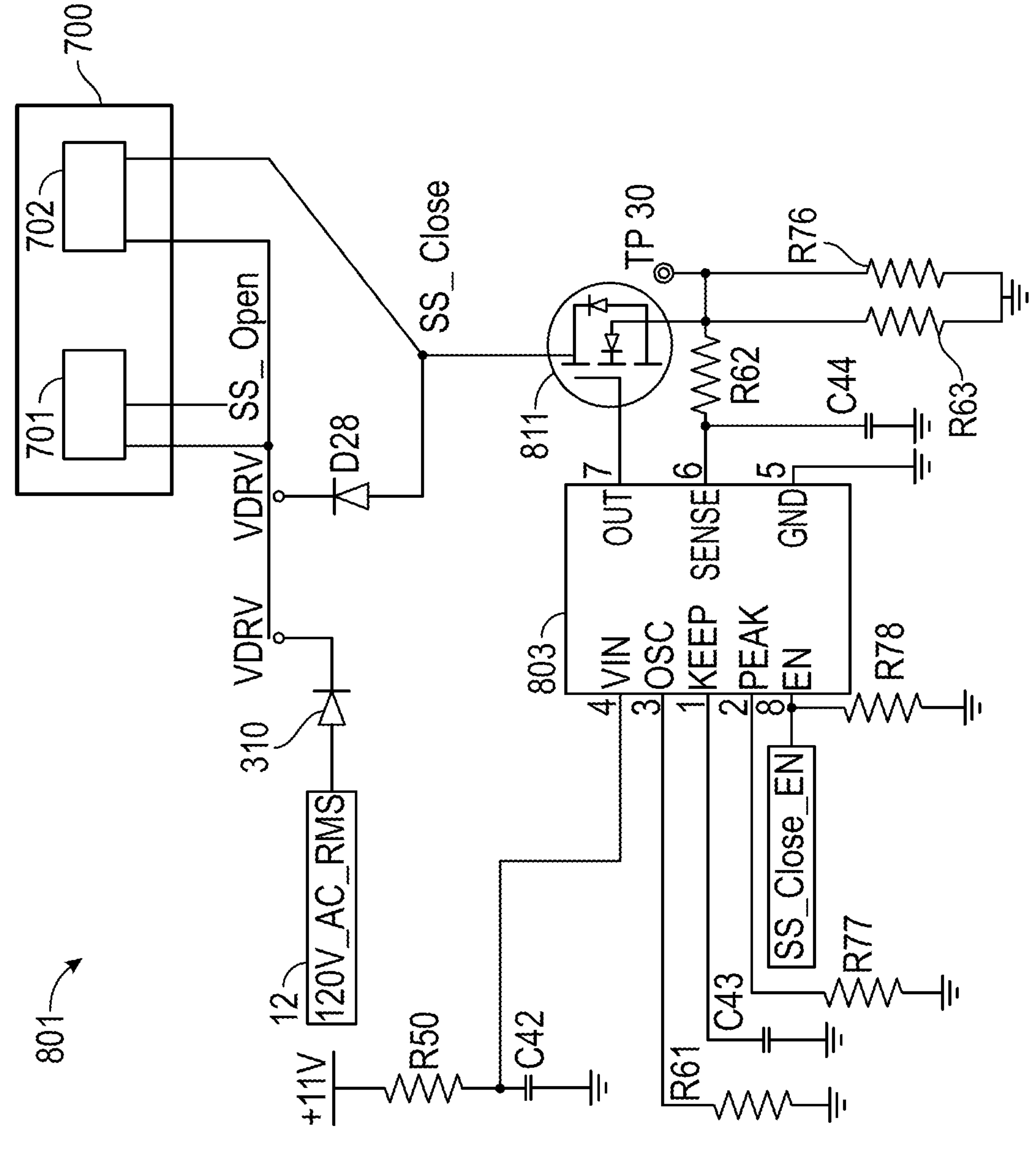
FIG. 2B is a schematic diagram of an exemplary close solenoid coil driver circuit for closing secondary contacts in accordance with an example embodiment of the disclosed concept.
Figure 3:
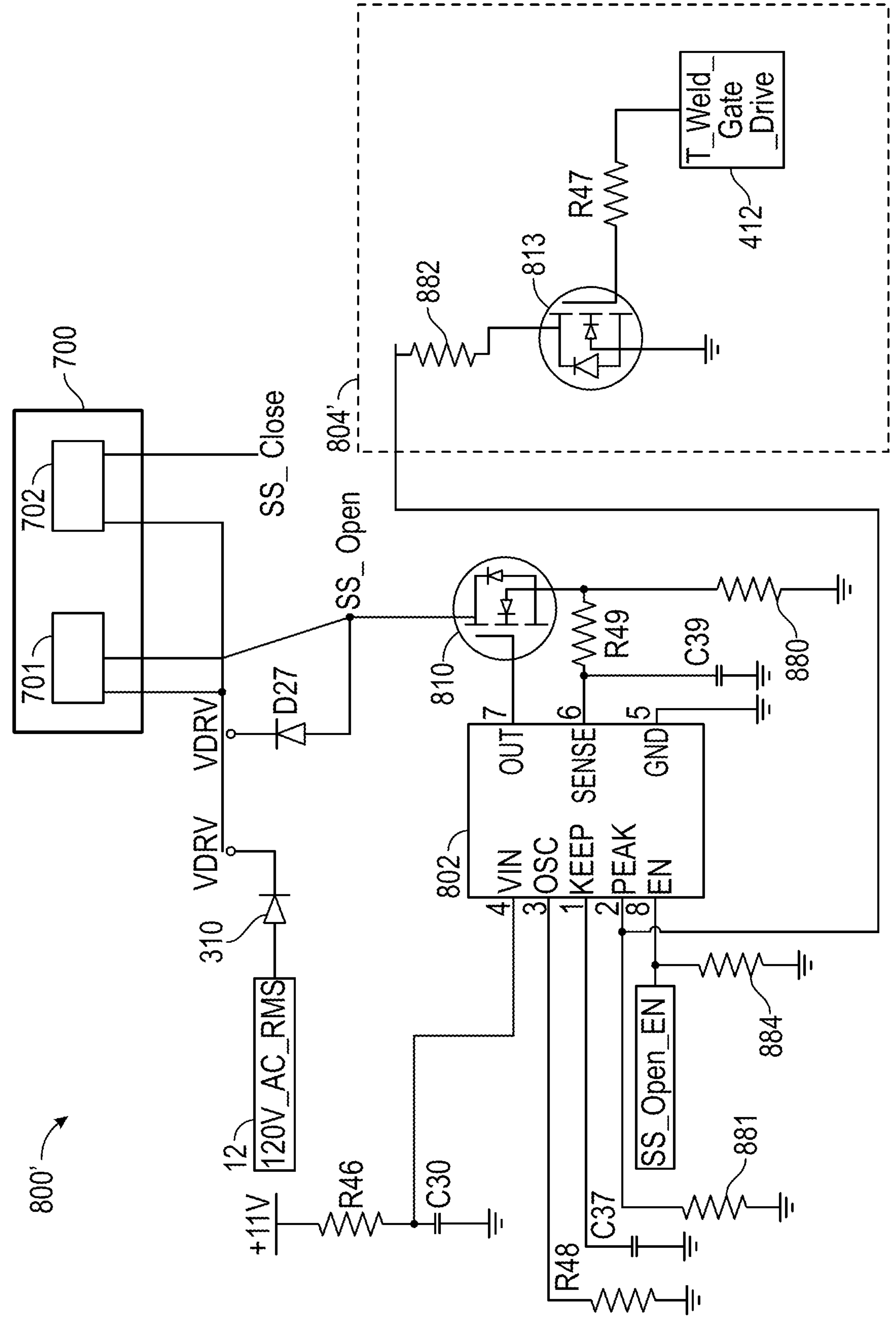
FIG. 3 is a schematic diagram of another exemplary solenoid driver circuit for opening secondary contacts in accordance with an example embodiment of the disclosed concept.

The power supply 300 supplies power to the processing unit 400 and other electrical components within the circuit breaker 1 (e.g., the PWM current controller 802, ZCD 500, an electronic trip unit, etc.) and may include a half-wave rectifier (e.g., a half-wave rectifier 310 as shown in FIGS. 2 and 3) coupled to the HOT conductor 12. The half rectifier 310 receives the line AC voltage (e.g., 120 V AC RMS at 60 Hz) from the HOT conductor 12 and rectifies the line AC voltage to DC voltage (e.g., 170 V). The ZCD 500 is coupled to the HOT conductor 12 and the processing unit 400. It is structured to detect the AC voltage crossing at near zero as the sine signal repeatedly goes up to its peak current and down to zero current and transmit a ZCD signal to the processing unit 400. In this embodiment, the ZCD 500 with a predefined offset (e.g., without limitation, 2 ms) is used to manage the solenoid operation. The predefined offset may vary based on the duration of the solenoid coil energization.

The processing unit 400 is structured to monitor and control operations of all electronics within the circuit breaker 1. It includes a control circuit 410 and, optionally, a memory. The control circuit 410 may include a communication module for an end user to access the circuit breaker 1 via a mobile device (e.g., a cellular phone, tablet, etc.) 7. The control circuit 410 may be a microprocessor, a microcontroller, or some other suitable processing device or circuitry. The communication module may be a transceiver that may communicate bi-directionally, via one or more antennas (not shown) via wireless links. The antennas may be capable of transmitting or receiving one or more wireless transmissions, e.g., from/to the communication module, the user device, etc. The memory may include random access memory and read only memory and storing computer-readable, computer-executable firmware including codes or instructions which, when executed, cause the control circuit 410 to perform various functions including controlling the PWM current controller 802 and switches in the solenoid driver circuit 800.

The secondary contacts 600 include a secondary stationary contact and a secondary movable contact coupled to a secondary moving arm electrically connected in series with the primary contacts 100 via the thermal-magnetic trip device. As such, a circuit is established from the HOT conductor 12 (coupled to a line terminal) through the primary contacts 100, the primary moving arm, the thermal-magnetic trip device, the secondary moving arm, the secondary contacts 300, the LOAD conductor 14 (coupled to a load terminal) and the load 5.

The solenoid 700 may be, e.g., a magnetically latchable solenoid, and opens and closes the secondary contacts 600 based on a driving output signal received from the PWM current controller 802. The solenoid 700 may include a plunger and a set of a close solenoid coil and an open solenoid coil. The close and open coils are wound on a same bobbin and separately drive to either open or close the secondary contacts 600. The solenoid 700 may be coupled to the half-wave rectifier circuit 310. The plunger moves, e.g., vertically, within the solenoid coils to cause the secondary contacts 600 to open or close. When the solenoid coil (a close solenoid coil 702 as shown in FIG. 2) is energized with a close pulse signal, a magnetic field is produced, which drives the plunger downwardly and closes the secondary contacts 700. When the solenoid coil (an open solenoid coil 701 as shown in FIG. 2) is energized with an open pulse signal, it lifts the plunger and the secondary moving arm.

The solenoid driver circuit 800, particularly the PWM current controller 802, drives the solenoid 700 to open the secondary contacts 600 based at least in part on a control signal received from the control circuit 410 of the processing unit 7. The control circuit 410 may transmit the control signal based at least in part on a user input received in a wireless or wired connection from a remote user device 7. For example, if the user inputs an open command signal, the control circuit 410 then transmits a control signal to open (e.g., ENABLE open pulse) to the PWM current controller 802, and the PWM current controller 802 causes the solenoid 700 to open the secondary contacts 600. The operation of the solenoid driver circuit 800 based on a plurality of peak solenoid current limits is discussed in detail with reference to FIGS. 2A and 3. If the user inputs a close command signal, there may be a separate driver circuit (e.g., a close solenoid coil driver circuit 801 as shown in FIG. 2B) within the circuit breaker 1 to close the secondary contacts 600 via the close solenoid coil. The separate driver circuit to close the secondary contacts 600 may be similar to the solenoid driver circuit 800 (as shown in FIG. 2A) except that it does not include a multi-peak-current-limit setting portion 804 (as shown in FIG. 2A) of the solenoid driver circuit 800.

FIG. 2A illustrates a schematic diagram of an example solenoid driver circuit 800 according to the disclosed concept. Similar to the conventional solenoid driver circuit, the solenoid driver circuit 800 includes a PWM current controller 802 coupled to the control circuit 410 the processing unit 400 and the solenoid 700 via a first switch 810, which is in turn coupled to first sense resistors 820 and 821. The first switch 810 may be a semiconductor switch, e.g., without limitation, a MOSFET, IGBT, etc. The gate terminal of the first switch 810 may be coupled to the PWM current controller 802 for adjusting the current flowing through the open solenoid coil 701 for a first period (e.g., without limitation, 4 milliseconds (ms)). The source terminal of the first switch 810 is also coupled to the first resistors 820,821. The first resistors 820,821 are structured to sense the solenoid current flowing through the open solenoid coil 701 during the first period. That is, the first resistors 820,821 measure/generate the voltages of the open solenoid coil 701 and input the voltages to pin 6 of the PWM current controller 802, which in turn determines the solenoid current based on the sensed voltages. The PWM current controller 802 may be a commercially available PWM current controller integrated chip. In operation, if a user request to open the secondary contacts 600 is received, the control circuit 410 transmits a control signal to open (e.g., ENABLE open) the secondary contacts 600 for the first period. Upon receiving the ENABLE open signal, the first resistors 820,821 sense the solenoid current of the open solenoid coil 701. The PWM current controller 802 sets a first peak current limit (e.g., without limitation, 4A), adjusts the solenoid current of the open solenoid coil 701 to achieve the first peak current limit for the first period and causes the solenoid 700 to open the secondary contacts 600. As such, during normal switching operation, the solenoid driver circuit 800 behaves similarly to the conventional solenoid driver circuit 800 using the conventional solenoid driver circuit components in order to open the secondary contacts 600.

However, in this non-limiting, example embodiment, the solenoid driver circuit 800 further includes an additional circuit (a multi-peak-current-limit setting portion) 804 that the conventional solenoid driver circuit does not have. The additional circuit 804 includes a third switch 814 and a second switch 812 coupled to the third switch 814, the PWM current controller 802 and second resistors 822,823 structured to be in parallel to the first resistors 820,821 upon turning ON of the second switch 812. The third switch 814 controls the second switch 812. The second and third switches 812,814 may be semiconductor switches such as MOSFETs, IGBTs, etc. The drain terminal of the third switch 814 is coupled to the gate of the second switch 812. The drain terminal of the second switch 812 is coupled to the first resistors 820,822 and the source terminal of the first switch 810. The source terminal of the second switch 812 is coupled to second resistors 822,823 structured to be in parallel to the first resistors 820,821 upon closing of the second switch 812.

In operation, based on a determination by the control circuit 410 that the secondary contacts 600 are in tack-welded condition, the control circuit 410 transmits a switch drive signal to the third switch 814 for a second period (e.g., without limitation, 6 ms). Upon receiving the switch drive signal, the third switch 814 is turned OFF and causes the second switch 812 to be turned ON. When the second switch 812 is turned ON, the second resistors 822,823 are rendered in parallel to the first resistors 820,821. Then, after a lapse of a portion (e.g., without limitation, 2 ms) of the second period, the control circuit 410 transmits a control signal to open (ENABLE open pulse) the secondary contacts 600 to pin 8 of the PWM current controller 802 for the first period overlapping the remainder of the second period. Upon receiving the ENABLE open signal from the control circuit 410, the first and second resistors 820,821,822,823 in parallel sense the solenoid current of the open solenoid coil 701. Based on the solenoid current sensed by both the first resistors 820,821 and the second resistors 822,823, the PWM controller 802 sets a second peak current limit (e.g., without limitation, 8A), and adjusts the solenoid current of the open solenoid coil 701 to achieve the second peak current limit via the first switch 810 for the first period. To adjust the solenoid current, the PWM current controller 802 turns ON the first switch 810 to increase the solenoid current or turn OFF to decrease the solenoid current. The second peak solenoid current limit is higher than the first peak solenoid current limit and provides a sufficient plunger force to break the tack weld and open the secondary contacts 600.

Thus, by changing resistance using the second switch 812 and the resistors 822-23, the solenoid driver circuit 800 is able to obtain a different regulated current. As such, unlike the conventional solenoid driver circuit, by simply adding the multi-peak-current-limit setting portion 804, the solenoid driver circuit 800 according to the disclosed concept allows a single PWM current controller 802 to drive the open solenoid coil 701 with two different peak current levels of, e.g., without limitation, 4A and 8A, to manage the solenoid plunger force regardless of whether the secondary contacts 600 are in normal condition or tack weld condition. Further, by requiring only one PWM current controller 802 to set multiple peak current limits with an addition of the switches (e.g., without limitation, MOSFETs) 812,814 and resistors 822,823, the solenoid driver circuit 800 saves manufacturing costs and breaker space.

In some examples, the ZCD technique is used to operate the solenoid operation. The ZC detector 500 detects zero crossing(s) of the AC line voltage and transmits a ZCD signal to the control circuit 410. The control circuit 410 then transmits the EANBLE open signal to the PWM current controller 802 upon a lapse of a predefined offset (e.g., without limitation, 2 ms) from a zero current detection. The use of ZCD technique eliminates a need to install a large reservoir capacitor that is otherwise required for energy storage to drive the solenoid 700 during negative half cycles in a half bridge configuration.

In addition, the solenoid driver circuit 800 may be used for both L1, L2 configuration of two phase and for L1, N configuration of a single phase. Further, the two peak currents use the same line voltage.

The first, second and third switches 810,814,812 may be semiconductor switch devices, e.g., MOSFETs, IGBT, or any other appropriate switching devices. While FIG. 2 shows two first resistors 820,821 and two second resistors 822,823, it is to be understood that this is for illustrative purposes only, and thus, there may be one or more than two first or second sense resisters in the solenoid driver circuit, depending on the breaker space availability, user preferences, and circumstances.

FIG. 2B illustrates a schematic diagram of a close solenoid coil driver circuit 801 according to a non-limiting, example embodiment of the disclosed concept. The close solenoid coil driver circuit 801 is similar to the solenoid driver circuit 800 of FIG. 2A without the multi-peak-current-limit setting portion 804, and thus overlapping description and/or disclosure is omitted for brevity. In operation, upon a determination that a user command to close the secondary contacts 600 is received, the control circuit 410 transmits a signal (e.g., ENABLE close signal) to a PWM current controller 803 to close the secondary contacts 600 using the close solenoid coil 702 for a first period. The control circuit 410 may transmit the ENABLE close signal upon a lapse of a predefined offset (e.g., 2 ms) of falling edge of positive zero crossing detection. The first period may last, e.g., without limitation 4 ms. The sense resistors R63,R76 sense current flowing through the close solenoid coil 702. The PWM current controller 803 adjusts the solenoid current to and causes the close solenoid coil 702 to close the secondary contacts 600. The control circuit 410 then stops transmitting the ENABLE close signal to the PWM current controller 803. The control circuit 410 then determines whether the secondary contacts 600 are closed. If the secondary contacts 600 are not closed, the control circuit 410 transmits an error signal to the user.

FIG. 3 illustrates a schematic diagram of another exemplary solenoid driver circuit 800' according to the disclosed concept. As previously stated, the solenoid 700 requires nearly 4A of peak current during normal operation for, e.g., without limitation, a two-pole circuit breaker, and 8A of peak current to generate sufficient plunger force to break tack weld in the secondary contacts 600 during opening operation of the secondary contacts 600. Similar to the solenoid driver circuit 800, the solenoid driver circuit 800' includes one PWM current controller 802 for opening the secondary contacts 600 in normal and tack-welded conditions. However, unlike the solenoid driver circuit 800, the solenoid driver circuit 800' includes only one additional switch 813, rather than two additional switches 812 and 814, and one additional resistor 882, rather than two additional resistors 822, 823 in order to meet the peak current requirements using the same PWM current controller 802 for the opening operation of the secondary contacts 600 by the solenoid 700.

The switch 813 is coupled to one end of a resistor 882 and is controlled by the control circuit 410 via a microcontroller pin (T_weld_gate_drive) 412. When a tack-welded condition of the secondary contacts 600 is detected or suspected (e.g., opening of the secondary contacts 600 using the first peak solenoid current limit has failed), the control circuit 410 transmits a tack-welded open signal to the switch 813 via the pin 410. Upon receiving the tack-welded open signal, the switch 813 is turned ON for 4 ms and another end of the resistor 882 becomes coupled to the pin 2 of the PWM current controller 802. Then, the resistor 882 runs parallel to the peak resistor 881 of the PWM current controller 802 and sets the second peak current limit (e.g., 8A) and adjusts the solenoid current during the opening of the secondary contacts 600 in tack-welded condition. During normal operation, the switch 813 is turned OFF, and the first peak current limit (e.g., 4A) is set by the peak resistor 881 and the sense resistor 880.

The solenoid driver circuit 800' is advantageous in that it further saves manufacturing costs and space within the PCB board since it only adds one additional switch 813 and one additional resistor 882 for achieving the second peak current limit for driving the solenoid 700 to open the secondary contacts 600 in tack-welded condition. For close operation, the close solenoid coil 702 is actuated by a separate close solenoid coil driver circuit similar to that illustrated in FIG. 2B.

Figure 4:
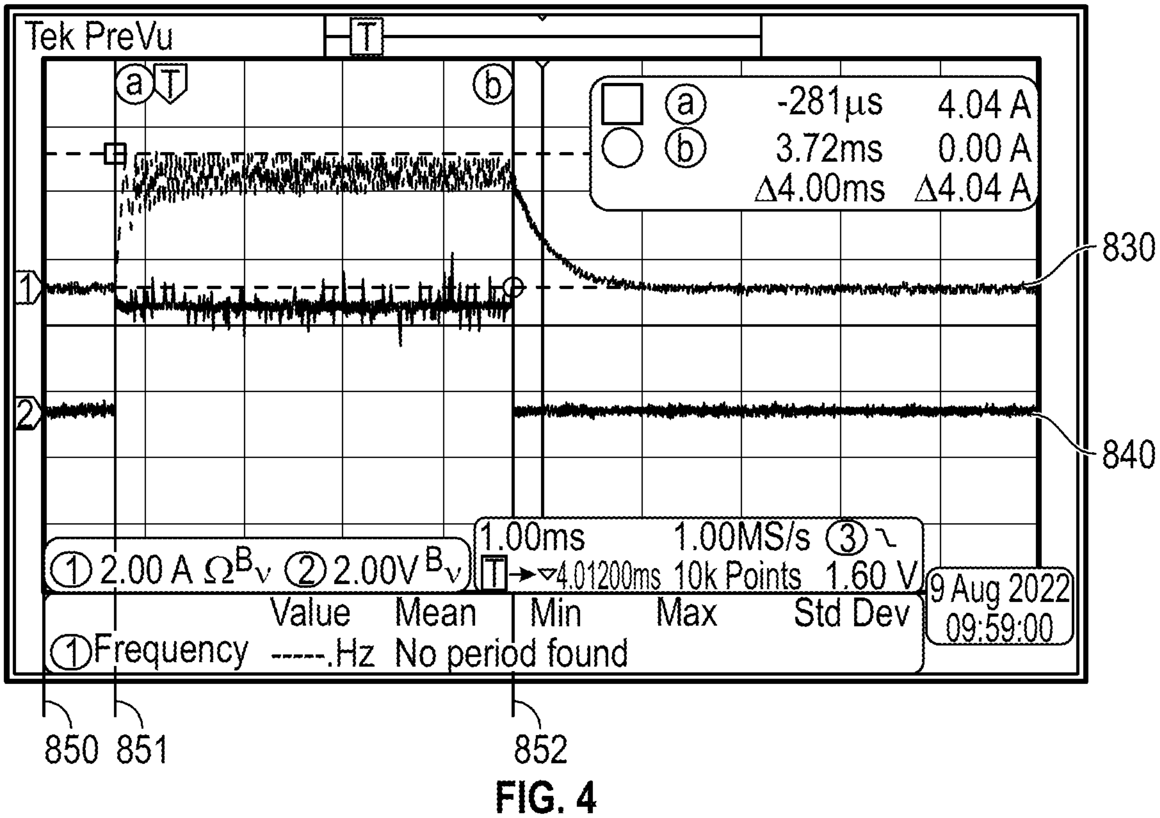
FIG. 4 illustrates waveforms for a control signal and a solenoid peak current during normal opening operation using the solenoid driver circuit of FIG. 2 in accordance with an example embodiment of the disclosed concept.

FIG. 4 illustrates waveforms of an ENABLE open signal 840 and solenoid current signal 830 to open the secondary contacts 600 in normal condition according to an example embodiment of the disclosed concept. The solenoid current signal 830 has 4A peak current requirement for solenoid activation for a 2-pole circuit breaker. From time zero 850 until time 851, the signal from the control circuit 410 and the solenoid current signals are low. At time 851, the control circuit 410 sends an ENABLE open (high) pulse to a PWM current controller. The ENABLE high pulse 840 lasts 4 ms from time 851 to time 852. During this period, the solenoid current 830 achieves a first peak current limit (e.g., without limitation, 4A) for 4 ms. At the lapse of the 4 ms at time 852, the PWM current controller 802 causes the solenoid 700 (i.e., the open solenoid coil 701) to open the secondary contacts 600, and the pulse 840 and the solenoid current 830 drop to low.

Figure 5:
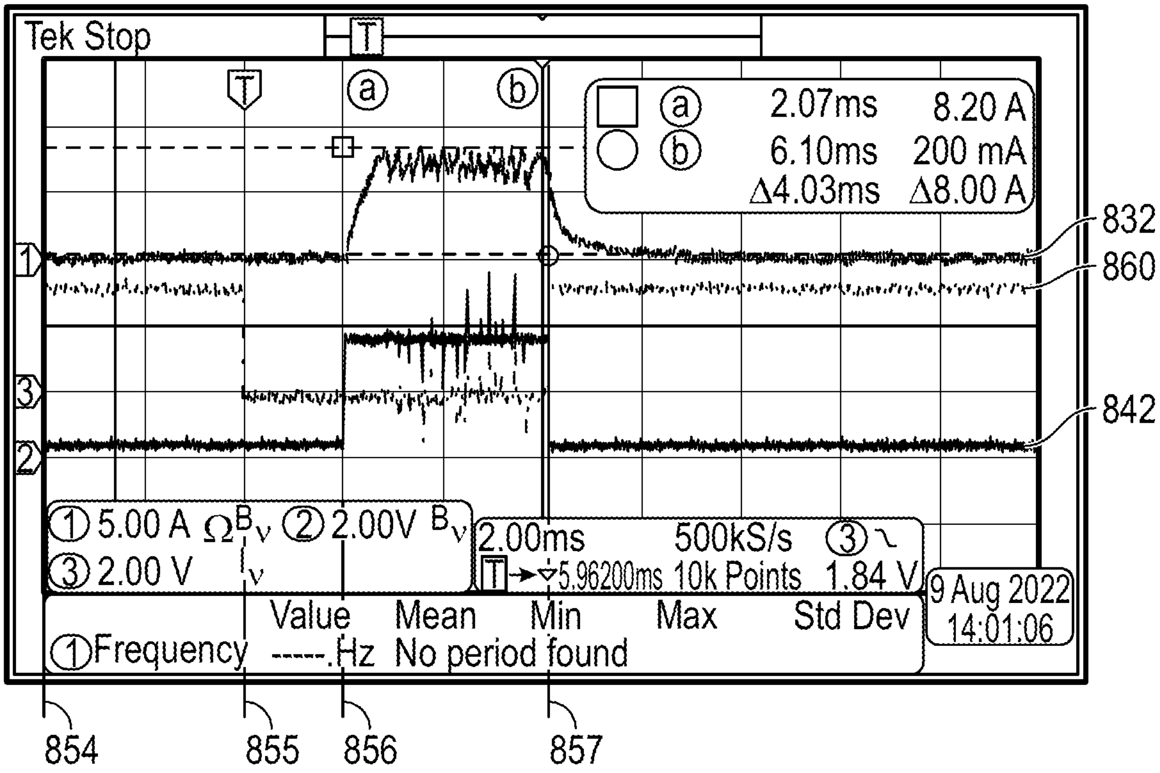
FIG. 5 illustrates waveforms for a control signal, a solenoid peak current and switching signal during tack-weld condition using the solenoid driver circuit of FIG. 2 in accordance with an example embodiment of the disclosed concept.

FIG. 5 illustrates waveforms of an ENABLE open signal 842, solenoid current signal 832 and a switch driving signal 860 to open the secondary contacts 600 in tack-weld condition according to an example embodiment of the disclosed concept. From time zero 854 until time 856, the ENABLE open pulse 842 and the solenoid current 832 are low. At time 855, the control circuit 410 sends a low pulse signal 860 to the third switch 814 to turn OFF and cause the second switch 812 to turn ON for 6 ms. At time 856, the control circuit 410 sends an ENABLE open signal to the PWM current controller 802 for 4 ms. From time 856 to time 857, the solenoid current 832 of the open solenoid coil 701 increases up to a second peak current limit (e.g., without limitation, 8A) and is regulated to achieve the second peak current limit by the PWM current controller 802 via the second switch 812. At the lapse of the 4 ms at time 857, the PWM current controller 802 causes the solenoid 700 to open the secondary contacts 600, and the ENABLE pulse and the solenoid current drop back to low. Also, at time 857, the 6 ms ends and the switch driving signal 860 returns to high and the third switch 814 is turned ON and the second switch 812 is turned OFF.

Figure 6:
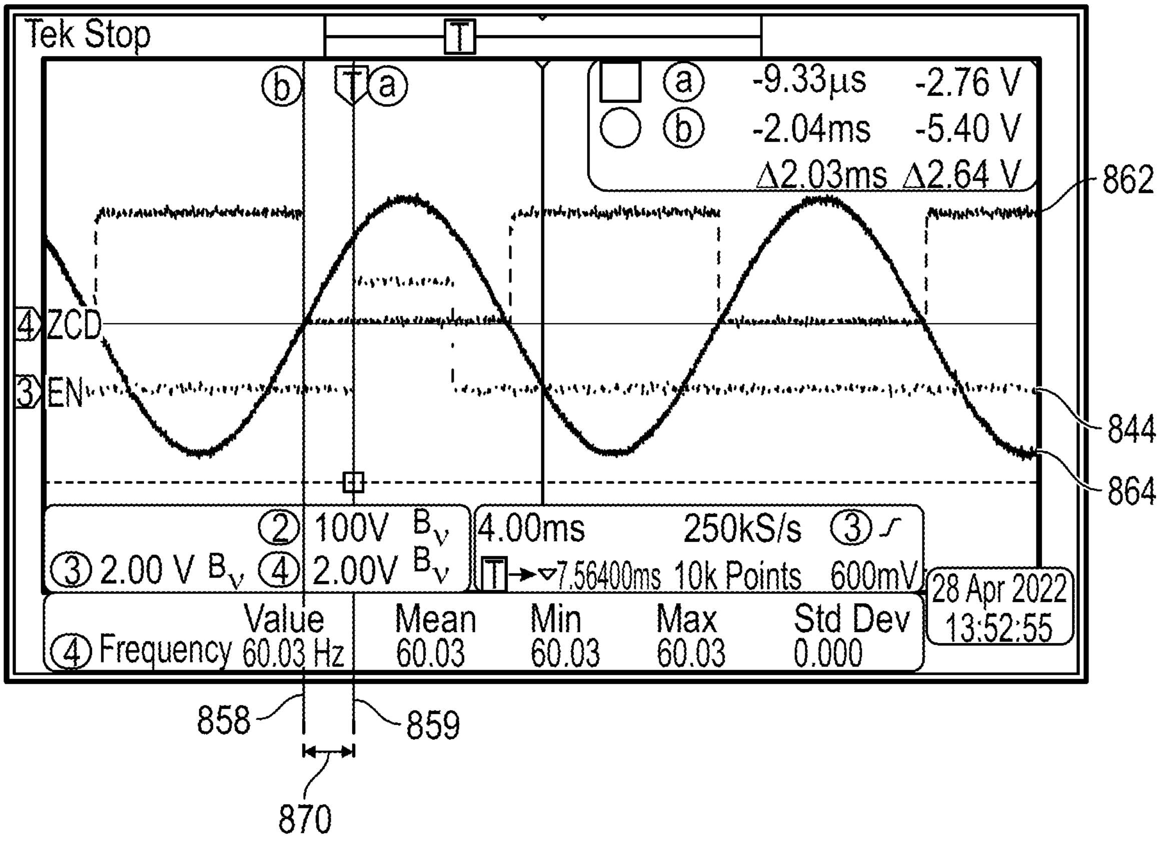
FIG. 6 illustrates waveforms for control signals with AC input voltage and zero crossing detection using the solenoid driver circuit of FIG. 2 in accordance with an example embodiment of the disclosed concept.

FIG. 6 illustrates waveforms of an ENABLE signal 844 with respect to input AC signal 864 and ZCD signal 862 according to an example of the disclosed concept. At time 858, a zero crossing is detected by the ZCD 500. From time 858 until time 859, there is a predefined offset 870 for 2 ms. At time 859, the predefined offset 870 lapses and the ENABLE high pulse 844 is generated for 4 ms after the 2 ms delay 870. ZC detection and the predefined offset 870 are used to achieve solenoid operation during positive half cycle with minimum voltage availability to drive the solenoid 700 without a storage capacitor, thereby saving costs and space within the circuit breaker.

Figure 7:
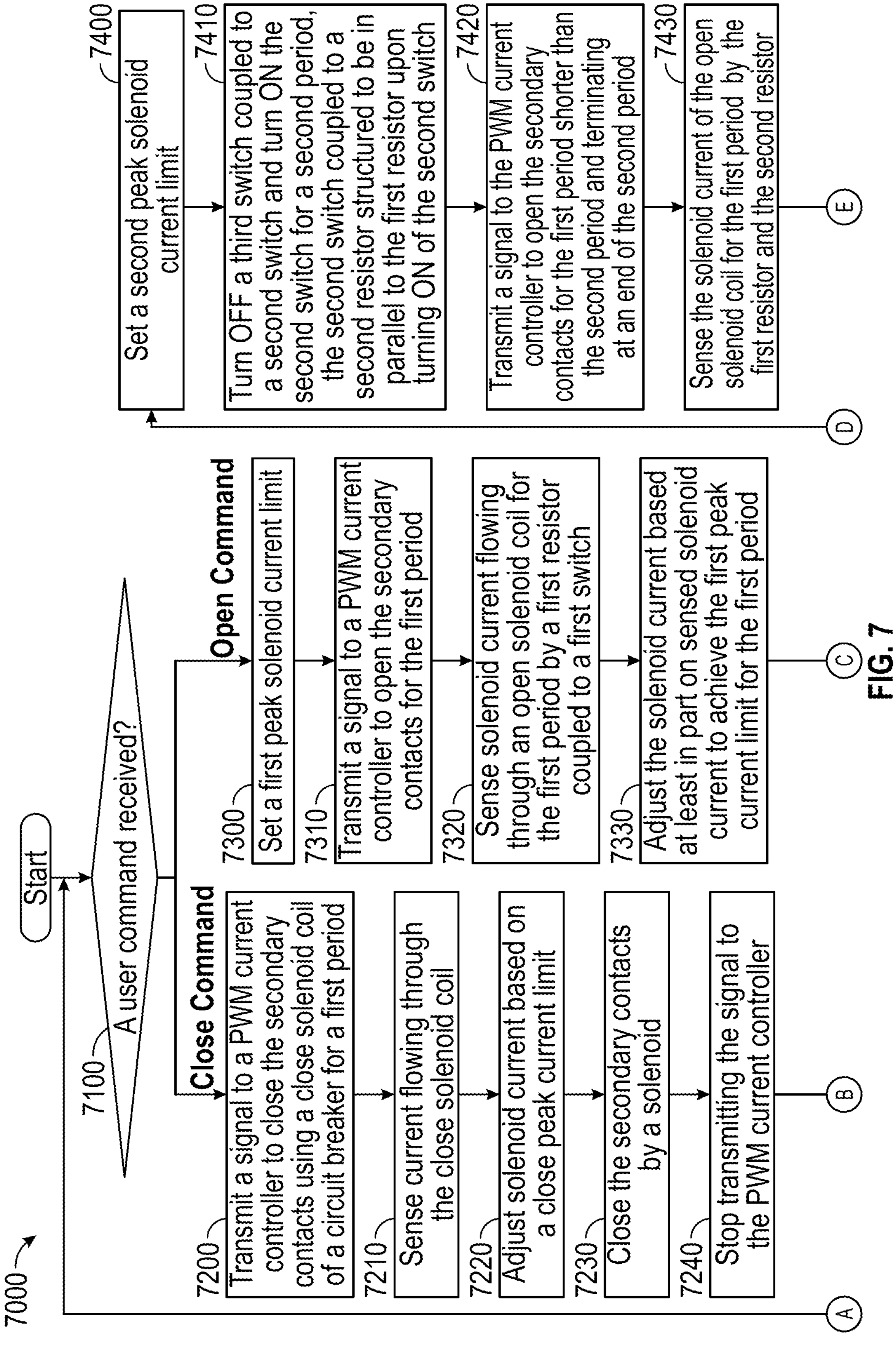
FIG. 7 is a flow chart of a method of opening secondary contacts during normal operation or tack weld condition using the solenoid driver circuit of FIG. 2 in accordance with an example embodiment of the disclosed concept.
Figure 7:
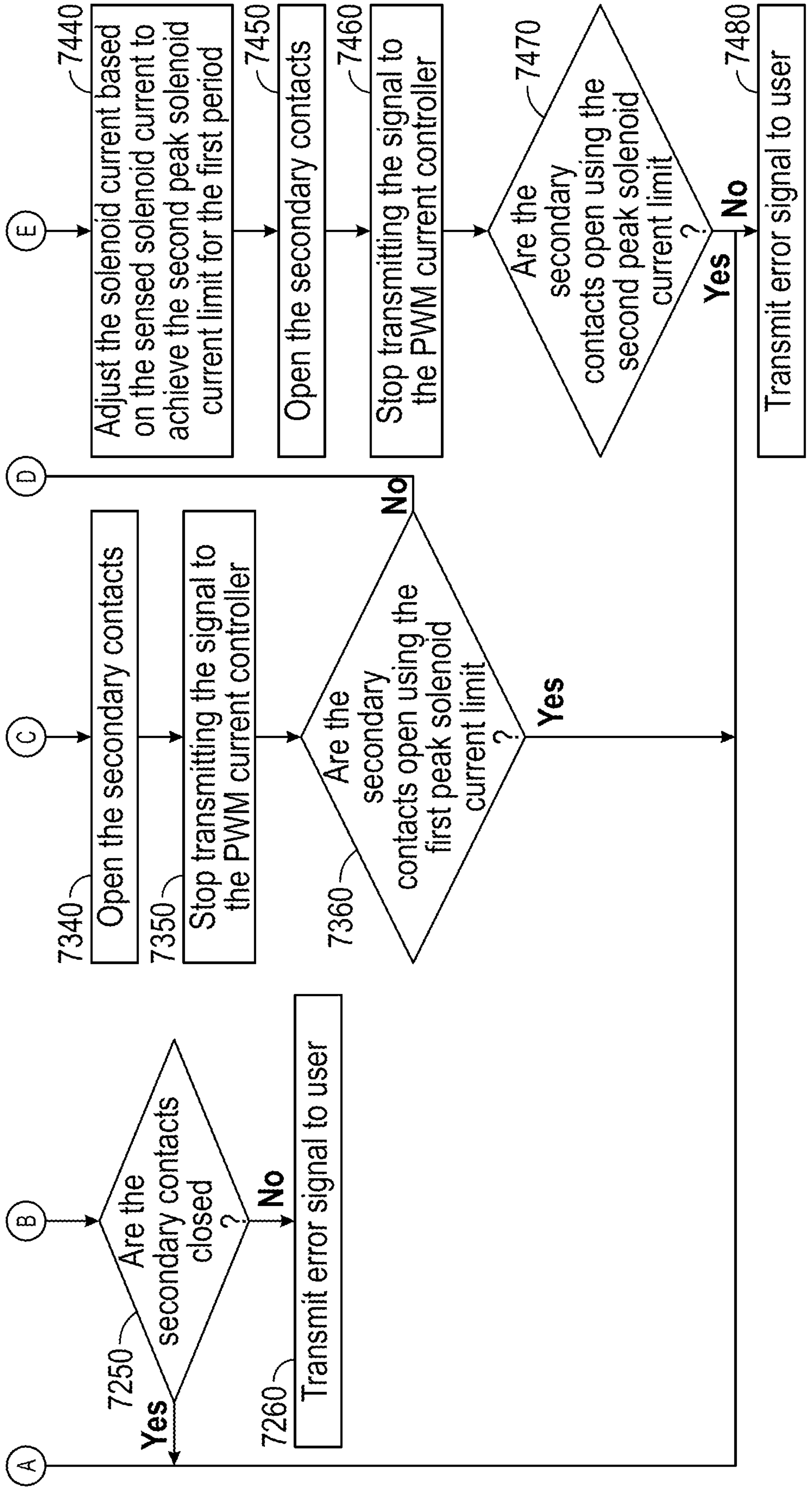

FIG. 7 is a flow chart of a method 7000 for driving solenoid to open or close secondary contacts in a circuit breaker according to an example embodiment of the disclosed concept. The method 7000 may be performed by a control circuit of the circuit breaker, the solenoid driver circuit 800 or its components thereof as described with reference to FIGS. 1-2.

At 7100, it is determined whether a user command has been received. For example, the control circuit determines whether the user command to open or close the secondary contacts or perform any other task has been received. If a user input requesting to open the secondary contacts is received, the method proceeds to 7300. If a user input requesting to close the secondary contacts, the method 7000 proceeds to 7200. If the user command is to perform other tasks, the control circuit may actuate relevant components of the circuit breaker to perform the tasks, which is not relevant to the inventive concept and thus such actuation steps are not included in this method 7000.

At 7200, the control circuit transmits a signal (e.g., ENABLE close signal) to a PWM current controller to close the secondary contacts using a close solenoid coil for a first period. The control circuit transmits the ENABLE close signal upon a lapse of a predefined offset (e.g., 2 ms) of falling edge of positive zero crossing detection. The first period may last, e.g., without limitation 4 ms. At 7210, the solenoid driver circuit senses current flowing through a close solenoid coil. At 7220, the PWM current controller adjusts the solenoid current to achieve a close peak current limit. At 7230, the PWM current controller causes the solenoid to close the secondary contacts. At 7240, the control circuit stops transmitting the ENABLE close signal to the PWM current controller. At 7250, the control circuit determines whether the secondary contacts are closed. If yes, the method returns to 7100. If no, at 7260 the control circuit transmits an error signal to the user.

At 7300, the solenoid driver circuit sets a first peak solenoid current limit to open the secondary contacts. The first peak solenoid current limit may be e.g., without limitation, 4A, required to open the secondary contacts during the normal contact opening operation (i.e., the secondary contacts are not in tack-weld condition). At 7310, the control circuit transmits a signal to the PWM current controller to open the secondary contacts for the first period. The signal may be, e.g., without example, ENABLE open control signal to open the secondary contacts using an open solenoid coil for the first period. The control circuit transmits the ENABLE open signal upon a lapse of a predefined offset (e.g., 2 ms) of falling edge of positive zero crossing detection. At 7320, current flowing through the open solenoid coil for the first period is sensed by a first resistor coupled to a first switch. Particularly, the first resistor measures/generates voltages of the open solenoid coil and inputs the voltages to the PWM current controller, which in turn determines the solenoid current based on the sensed voltages. At 7330, the PWM current controller adjusts the solenoid current flowing through the open solenoid coil to achieve the first peak current limit for the first period. At 7340, the PWM current controller causes the solenoid to open the secondary contacts. At 7350, the control circuit stops transmitting the ENABLE open signal to the PWM current controller. At 7360, the control circuit determines whether the secondary contacts are open using the first peak solenoid current limit. That is, it determines whether the solenoid was able to open the secondary contacts using the first peak solenoid current limit. If yes, the method 7000 returns to 7100. If no, the method 7000 proceeds to 7400.

At 7400, the solenoid driver circuit sets a second peak solenoid current limit (e.g., without limitation, 8A). At 7410, the third switch turns OFF and causes the second switch to turn ON for a second period. That is, the control circuit transmits a switch drive signal (e.g., tack-weld gate drive signal) to the third switch to open for a second period based on a determination that the secondary contacts are in tack-welded condition. At 7420, the control circuit transmits a signal (e.g., ENABLE open) to the PWM current controller to open the secondary contacts for the first period using the open solenoid coil. In some examples, the control circuit transmits the ENABLE open signal upon a lapse of a predefined offset (e.g., 2 ms) of falling edge of positive zero crossing detection. The first period may start two milliseconds after the beginning of the second period and lasts until the end of the second period. At 7430, the first resistor and the second resistor in parallel to the first resistor together sense the solenoid current flowing through the open solenoid coil for the first period. At 7440, the PWM current controller adjusts the current flowing through the open solenoid coil based on the sensed solenoid current to achieve the second peak solenoid current limit for the first period. At 7450, the PWM current controller causes the solenoid to open the secondary contacts upon reaching the second peak current limit. At 7460, the control circuit stops transmitting the EANBLE open signal to the PWM current controller as well as the tack-weld gate drive signal to the third switch. At 7470, the control circuit determines whether the secondary contacts are open using the second peak solenoid current limit. If yes, the method 7000 returns to 7100. If no, at 7480 the control circuit transmits an error signal the user. The user may then take appropriate actions (e.g., without limitation, manually trip the circuit breaker).

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of disclosed concept which is to be given the full breadth of the claims appended and any and all equivalents thereof.

What is claimed is:

1. A solenoid driver circuit for a circuit breaker including a control circuit, a solenoid and secondary contacts and structured to be coupled between a power source and a load, the solenoid driver circuit comprising:

a first switch coupled to the solenoid and a first resistor structured to sense solenoid current;

a second switch coupled to a second resistor, the second switch structured to be turned on based on a switch drive signal from the control circuit; and one pulse width modulation (PWM) current controller coupled to the control circuit, the first switch, the second switch and the first resistor, the one PWM current controller structured to adjust the solenoid current and drive the solenoid to open or close the secondary contacts using a plurality of peak solenoid current limits including a first peak solenoid current limit and a second peak solenoid current limit.

2. The solenoid driver circuit of claim 1, wherein the PWM current controller adjusts the solenoid current to achieve the first peak solenoid current limit for a first period based on the solenoid current sensed by the first resistor only when the secondary contacts are in normal condition.

3. The solenoid driver circuit of claim 1, further comprising:

a third switch coupled to the control circuit and the second switch, the third switch structured to receive the switch drive signal from the control circuit based on a determination that the secondary contacts are in tack-welded condition and cause the second switch to be turned on for a second period based on the switch drive signal, the second resistor structured to be in parallel with the first resistor upon turning on the second switch, wherein the PWM current controller adjusts the solenoid current to achieve the second peak solenoid current limit for a first period based on the solenoid current sensed by both the first resistor and the second resistor in parallel to the first resistor when the secondary contacts are in tack welded condition, the second period commencing earlier than the first period and terminating at an end of the first period.

4. The solenoid driver circuit of claim 3, wherein the PWM current controller is further structured to set the first peak solenoid current limit based on the solenoid current sensed by the first resistor only and the second peak solenoid current limit based on the solenoid current sensed by both the first resistor and the second resistor in parallel.

5. The solenoid driver circuit of claim 1, wherein the second switch is coupled to the control circuit, the second switch structured to receive the switch drive signal from the control circuit based on a determination that the secondary contacts are in tack-welded condition and be turned on upon receiving the switch drive signal, the second resistor is structured to be in parallel with a peak resistor of the PWM current controller upon turning on the second switch, and the PWM current controller adjusts the solenoid current based at least in part on output from the peak resistor and the second resistor in parallel to the peak resistor to achieve the second peak solenoid current limit for a first period.

6. The solenoid driver circuit of claim 1, wherein the second switch is structured to be turned off during a first period in which the PWM current controller adjusts the solenoid current to achieve the first peak solenoid current limit.

7. The solenoid driver circuit of claim 1, wherein the second peak solenoid current limit is higher than the first peak solenoid current limit and provides a plunger force sufficient to open the secondary contacts in tack welded condition.

8. The solenoid driver circuit of claim 1, further comprising a zero crossing detector structured to detect a zero crossing of AC line voltage and transmit a zero crossing detection signal to the control circuit.

9. The solenoid driver circuit of claim 8, wherein the control circuit transmits a control signal to the PWM current controller to open or close the secondary contacts upon a lapse of a predefined offset commencing at the zero crossing detection.

10. A circuit breaker comprising:

primary contacts and secondary contacts coupled to the primary contacts in series;

an operating mechanism structured to open and close the primary contacts based on operation of a trip device;

a control circuit structured to control and monitor operation of the circuit breaker;

a solenoid; and a solenoid driver circuit comprising:

a first switch coupled to the solenoid and a first resistor structured to sense solenoid current;

a second switch coupled to a second resistor, the second switch structured to be turned on based on a switch drive signal from the control circuit; and one pulse width modulation (PWM) current controller coupled to the control circuit, the first switch, the second switch and the first resistor, the one PWM current controller structured to adjust the solenoid current and drive the solenoid to open or close the secondary contacts using a plurality of peak solenoid current limits including a first peak solenoid current limit and a second peak solenoid current limit.

11. The circuit breaker of claim 10, wherein the solenoid driver circuit further comprises:

a third switch coupled to the control circuit and the second switch, the third switch structured to receive the switch drive signal from the control circuit based on a determination that the secondary contacts are in tack-welded condition and cause the second switch to be turned on for a second period based on the switch drive signal, the second resistor structured to be in parallel with the first resistor upon turning on the second switch, wherein the PWM current controller adjusts the solenoid current to achieve the second peak solenoid current limit for a first period based on the solenoid current sensed by both the first resistor and the second resistor in parallel to the first resistor when the secondary contacts are in tack welded condition, the second period commencing earlier than the first period and terminating at an end of the first period.

12. The circuit breaker of claim 11, wherein the PWM current controller is further structured to set the first peak solenoid current limit based on the solenoid current sensed by the first resistor only and the second peak solenoid current limit based on the solenoid current sensed by both the first resistor and the second resistor in parallel.

13. The circuit breaker of claim 10, wherein the second switch is coupled to the control circuit, the second switch structured to receive the switch drive signal from the control circuit based on a determination that the secondary contacts are in tack-welded condition and be turned on upon receiving the switch drive signal, the second resistor is structured to be in parallel with a peak resistor of the PWM current controller upon turning on the second switch, and the PWM current controller adjusts the solenoid current based on output from the peak resistor and the second resistor in parallel to achieve the second peak solenoid current limit for a first period.

14. The circuit breaker of claim 10, wherein a determination that the secondary contacts are in tack-welded condition is based at least in part on a determination that the solenoid is unable to open the secondary contacts using the first peak solenoid current limit.

15. A method of opening or closing secondary contacts of a circuit breaker having a control circuit and a solenoid driver circuit, the method comprising:

determining if a user command to open the secondary contacts has been received;

in response to a determination that the user command to open the secondary contacts has been received, opening the secondary contacts by a solenoid coupled to one pulse width modulation (PWM) current controller of the solenoid driver circuit using a first peak solenoid current limit;

determining if the secondary contacts are open using the first peak solenoid current limit; and in response to a determination that the secondary contacts are not open, opening the secondary contacts by the solenoid coupled to the one PWM current controller using a second peak solenoid current limit.

16. The method of claim 15, wherein opening the secondary contacts by the solenoid coupled to the one PWM current controller using the first peak solenoid current limit comprises:

setting the first peak solenoid current limit;

transmitting a control signal to the one PWM current controller to open the secondary contacts for a first period;

sensing solenoid current for the first period by a first resistor coupled to a first switch that is coupled to the PWM current controller and the solenoid;

adjusting the solenoid current based at least in part on the solenoid current sensed by the first resistor to achieve the first peak solenoid current limit for the first period; and opening the secondary contacts.

17. The method of claim 15, wherein opening the secondary contacts by the solenoid coupled to the one PWM current controller using the second peak solenoid current limit comprises:

setting the second peak solenoid current limit;

turning off a third switch coupled to the control circuit and a second switch and turning on the second switch for a second period, the second switch coupled to the third switch and a second resistor structured to be in parallel to a first resistor upon turning on the second switch, the first resistor coupled to a first switch that is coupled to the PWM current controller and the solenoid;

transmitting a control signal to the PWM current controller to open the secondary contacts for a first period that is shorter than the second period and terminates at an end of the second period;

sensing, by the first resistor and the second resistor in parallel to the first resistor, solenoid current for the first period;

adjusting the solenoid current based at least in part on the sensed solenoid current to achieve the second peak solenoid current limit for the first period; and opening the secondary contacts.

18. The method of claim 15, wherein opening the secondary contacts by the solenoid coupled to the one PWM current controller using the second peak solenoid current limit comprises:

setting the second peak solenoid current limit;

turning on a second switch based on a switch drive signal received from a control circuit, the second switch coupled to the control circuit and the one PWM current controller via a second resistor that is structured to be in parallel to a peak resistor of the one PWM current controller upon turning on the second switch;

transmitting a control signal to the PWM current controller to open the secondary contacts for a first period;

adjusting the solenoid current based at least in part on output of the peak resistor and the second resistor in parallel to the peak resistor; and opening the secondary contacts.

19. The method of claim 15, further comprising:

detecting, by a zero crossing detector of the solenoid driver circuit, zero crossing of an AC line voltage; and transmitting a control signal to the PWM current controller to open or close the secondary contacts upon a lapse of a predefined offset from the zero crossing detection.

20. The method of claim 15, wherein the second peak solenoid current limit is higher than the first peak solenoid current limit and provides a plunger force sufficient to open the secondary contacts in tack welded condition.

* * * * *